(12) United States Patent
Kurita et al.

(10) Patent No.: US 6,323,261 B2
(45) Date of Patent: *Nov. 27, 2001

(54) PROCESS AND APPARATUS FOR PRODUCING CHLORINATED RUBBER

(75) Inventors: Naoyasu Kurita; Jun-ichi Hisano; Masanori Konishi; Tadashi Janado; Mutsumi Nakayama; Shinji Nakano; Toshiyuki Yoshida, all of Tokyo (JP)

(73) Assignee: Asahi Denka Kogyo K.K., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,309

(22) PCT Filed: Dec. 10, 1997

(86) PCT No.: PCT/JP97/04549

§ 371 Date: Apr. 22, 1999

§ 102(e) Date: Apr. 22, 1999

(87) PCT Pub. No.: WO98/25973

PCT Pub. Date: Jun. 18, 1998

(30) Foreign Application Priority Data

Dec. 11, 1996 (JP) .................................................... 8-331098
Dec. 11, 1996 (JP) .................................................... 8-331115
Dec. 17, 1996 (JP) .................................................... 8-337169

(51) Int. Cl.$^7$ ................................. C08K 3/00; C08L 3/00
(52) U.S. Cl. ........................................... 523/330; 528/499
(58) Field of Search ............................... 523/330; 528/499

(56) References Cited

U.S. PATENT DOCUMENTS

| 3,677,321 | * | 7/1972 | Felstead | ................................. 159/48 |
| 3,932,370 | * | 1/1976 | Landi | ................................. 260/80.3 |
| 4,358,901 | * | 11/1982 | Takabatake | ............................. 34/57 |
| 4,430,483 | * | 2/1984 | Alfes | ..................................... 525/356 |
| 5,336,332 | * | 8/1994 | Satoh | ................................. 134/22.1 |
| 6,058,624 | * | 5/2000 | Bach | ..................................... 34/374 |

FOREIGN PATENT DOCUMENTS

| 0 545 593 | * | 6/1993 | (EP) . |
| 53-11988 | | 2/1978 | (JP) . |
| 1-299637 | * | 12/1990 | (JP) . |

* cited by examiner

*Primary Examiner*—Paul R. Michl
(74) *Attorney, Agent, or Firm*—Sughrue, Mion, Zinn, Macpeak & Seas, PLLC (57) ABSTRACT

The present invention provides a method of producing a chlorinated rubber wherein an acidic or highly acidic chlorinated rubber cake obtained after chlorinating a rubber latex or an aqueous dispersion is subjected to fluidized drying together with a drying medium to obtain a preliminary dried powder, and the preliminary dried powder is subjected to fluidized drying again. According to the present invention, a high quality chlorinated rubber can be obtained efficiently with easy handling from an acidic or highly acidic chlorinated rubber cake obtained after chlorinating a rubber latex or an aqueous dispersion.

8 Claims, 6 Drawing Sheets

PROCESS AND APPARATUS FOR PRODUCING CHLORINATED RUBBER

TECHNICAL FIELD

The present invention relates to a method and apparatus for producing a chlorinated rubber. More specifically, it relates to a method and apparatus for efficiently producing a chlorinated rubber from a chlorinated rubber cake obtained by chlorinating an acidic or highly acidic rubber latex maintaining high quality.

BACKGROUND ART

Since chlorinated rubber obtained by chlorinating natural rubber or a polyisoprene rubber such as synthetic isoprene has excellent acid resistance, alkaline resistance, chemical resistance, flame resistance and conductivity as well as a film forming capability, it is used in varnishes, paints, printing ink vehicles, wrapping films, adhesives etc. In particular, a highly chlorinated product having a chlorine content of 55% by weight or more is widely used as a material for anti-corrosion paints having excellent drying properties.

Conventionally, as a method for chlorinating a polyisoprene rubber, a method consisting of obtaining powders by dissolving a polyisoprene rubber in a chlorinated hydrocarbon solvent, then blowing in a chlorine gas for reaction, and then evaporating the chlorinated hydrocarbon by a spray dry method is known. This method is widely used since it can chlorinate a polyisoprene rubber homogeneously and obtain a highly chlorinated rubber soluble in an organic solvent. However, in view of recent movements for global environmental conservation, the use of chlorinated hydrocarbon solvents (carbon tetrachloride) is expected to be limited.

Hence, development of a method for dispersing and chlorinating a polyisoprene rubber in an aqueous medium is increasingly desired. Accordingly, the present inventors proposed a technique for obtaining a chlorinated rubber by supplying a chlorine gas to a highly acidic aqueous rubber latex as disclosed in Japanese Patent Laid-Open No. 5-202101.

The chlorination method disclosed in Japanese Patent Laid-Open No. 5-202101 is a method of blowing a chlorine gas into a polyisoprene-containing highly acidic aqueous rubber latex, more specifically, it is a method of placing highly concentrated hydrochloric acid in a reaction vessel, cooling, introducing chlorine while stirring under ultraviolet ray irradiation, and dropping a polyisoprene rubber latex with a surfactant dispersed therein for chlorination.

Nevertheless, it was found that the chlorinated rubber slurry obtained by this chlorination method has characteristics unlike conventional ones. That is, since it easily adheres to the wall portion of a drying device when drying a chlorinated rubber cake obtained by filtrating the chlorinated rubber slurry, and easily forms a large agglomerate, the drying efficiency in a conventional drying method is extremely poor. For example, a pneumatic drier is used for drying cake-like powders, but since the above-mentioned chlorinated rubber cake adheres to the wall portion, a drying air flow cannot be applied thereto.

In the case where a chlorinated rubber is utilized in inks, paints, or adhesives, the molecular weight thereof needs to be controlled. However, there is a risk that the molecular weight will change unless the production process for the chlorinated rubber cake is finished in a short time.

Further, in order to prepare a chlorinated rubber cake from a chlorinated rubber slurry, for example, a centrifugal separator is used. However, since the chlorinated rubber obtained by the above-mentioned method has extremely small particles, the filtration property becomes remarkably poor when the thickness of the cake accumulated in the centrifugal separator becomes about 30 mm or more so that, when washing with water is included, a long time consuming operation is required for one cycle, and thus molecular weight change is liable to occur. Moreover, the water content of the chlorinated rubber cake needs to be adjusted to within 45 to 65% since the cake becomes hard with a water content of 40% or less.

Further, since a chlorinated rubber slurry is collected from a highly acidic aqueous medium, it limits the material of the centrifugal separator.

DISCLOSURE OF INVENTION

Accordingly, an object of the present invention is to provide a method and apparatus for producing a high quality chlorinated rubber from an acidic or highly acidic chlorinated rubber cake obtained by chlorinating a rubber latex or a water dispersion thereof efficiently and with easy handling.

The present inventors conducted intensive study to solve the above-mentioned problems.

That is, the present invention provides a method for producing a chlorinated rubber comprising fluidized drying an acidic or highly acidic chlorinated rubber cake obtained after chlorinating a rubber latex or an aqueous dispersion with a drying medium to obtain preliminary dried powder, and fluidized drying of the preliminary dried powder again.

Further, the present invention provides an apparatus for producing a chlorinated rubber equipped with an (A) unit comprising a fluidized drying means using a medium (hereinafter referred to as "fluidized medium drying means") having a supply opening for a chlorinated rubber cake, and containing a drying medium in an inside portion thereof, a bag filter connected with the fluidized medium drying means via a conduit, and a fluidized drying means provided downstream of the bag filter.

Furthermore, the present invention provides an apparatus for producing the chlorinated rubber, comprising a (B) unit upstream of the (A) unit, the (B) unit being an apparatus for producing a chlorinated rubber cake from a chlorinated rubber slurry obtained after chlorinating a rubber latex or an aqueous dispersion, comprising:

a belt filter which is movable in the horizontal direction, and a means for suctioning water contained in the chlorinated rubber slurry via the belt filter.

Still further, the present invention provides an apparatus for producing the chlorinated rubber comprising the (B) unit upstream of the (A) unit, and further comprising a (C) unit upstream of the (B) unit, the (C) unit being an apparatus for producing a chlorinated rubber slurry obtained by chlorinating a rubber latex or an aqueous dispersion, comprising:

a reaction vessel for accommodating the reaction liquid, provided with an outlet portion for the reaction liquid, a circulating line for guiding the reaction liquid from the outlet portion to outside of the reaction vessel, and returning it back to the reaction vessel, a heat exchanger provided at at least one point in the circulating line, and a UV lamp provided in the reaction vessel and/or the circulating line.

BEST MODE FOR CARRYING OUT THE INVENTION

Hereinafter the present invention will be explained in detail with reference to the accompanying drawings.

Figure 1:
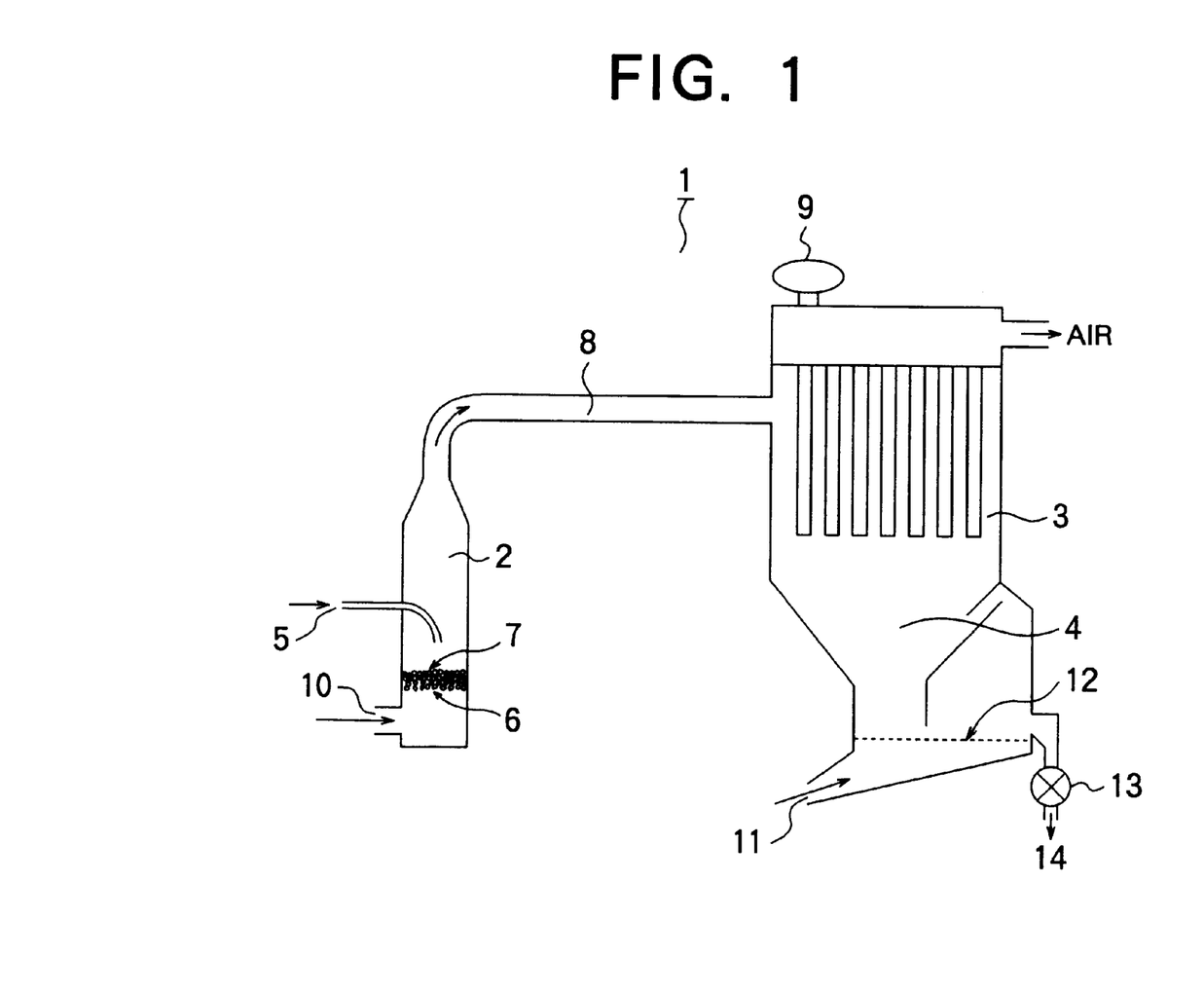
FIG. 1 is a diagram for explaining a first embodiment of the apparatus of the present invention.

FIG. 1 is a diagram for explaining a first embodiment of the apparatus of the present invention.

The apparatus 1 of the present invention comprises a fluidized medium drying means 2, a bag filter 3, and a fluidized drying means 4.

The fluidized medium drying means 2 is provided with a hot air supply opening 10 at the bottom portion for supplying hot air for drying. A flat perforated tray 6 with a drying medium 7 thereon is provided downstream of the hot air supply opening 10. The drying medium in this embodiment is shown as drying medium balls or balls 7. A large number of the balls 7, which preferably have a diameter of 2 to 5 mm, are placed on the flat perforated tray 6 to a thickness of about 50 to 300 mm. As a material for the medium balls, it must be considered that they may come in contact with chlorine or hydrochloric acid, that large ones are not preferable since they are expected to flow and further that balls having a specific gravity similar to that of a chlorinated rubber cake are also not preferable. In view of these points, the diameter of the medium balls 7 is preferably 2 to 5 mm as mentioned above, and the material is preferably alumina, silicon nitride, quartz, and the like. The flat perforated tray 6 allows passage of the hot air, but does not allow passage of the balls.

A supply opening 5 for the chlorinated rubber cake is provided in the fluidized medium drying means 2 so that the chlorinated rubber cake obtained by chlorinating an acidic or highly acidic rubber latex is introduced therefrom. The introduced chlorinated rubber cake is dried along with the fluid motion of the balls 7 caused by the hot air to become powdery, and is blown up to an upper portion of the fluidized medium drying means 2. The temperature of the hot air is, for example, 50 to 130° C., preferably 70 to 100° C. With this temperature range, the drying efficiency is improved, deterioration of the chlorinated rubber cake powders can be prevented, and further, adhesion and re-agglomeration of the powder can be suppressed. Most of the water contained in the chlorinated rubber cake can be eliminated by the fluidized medium drying means 2 to provide a wet powder.

The wet powder (chlorinated rubber powder) blown up to the upper portion of the fluidized medium drying means 2 reaches a conduit 8. The conduit 8 is made from with a diameter and a length that do not prevent the passage of the chlorinated rubber powder. For example, it can be made from stainless steel, a fluororesin-coated material, and the like, with a 300 to 1,000 mm diameter and a 3 to 15 mm length.

An end of the conduit 8 is connected to the bag filter 3. The bag filter 3 can be a known type comprising a plurality of cylindrical filter cloths. The powder of the chlorinated rubber passes through the conduit 8 to contact the bag filter 3 and drop into the fluidized drying means 4 at a lower portion. Powder adhering to the bag filter 3 is blown away at appropriate intervals by compressed high pressure air supplied from a pulse air generator 9 provided above the bag filter 3 so as to reach the fluidized drying means 4.

The fluidized drying means 4 is provided below the bag filter 3 for finishing the powder of the chlorinated rubber. A hot air supply opening 11 is provided at the bottom of the fluidized drying means 4 for supplying hot air for drying. A flat perforated tray 12 is provided downstream of the hot air supply opening 11. It is preferable that the flat perforated tray 12 does not allow the powder to easily pass. The powder blown by the hot air from the hole portions of the flat perforated tray 12, is dried for finishing, and passes through a rotary valve 13 so as to be discharged from the powder output opening 14. A preferable temperature of the hot air in the flow drying means 4 is, for example, 60 to 100° C.

A preferable manufacturing embodiment of the chlorinated rubber cake to be used is described below.

Figure 2:
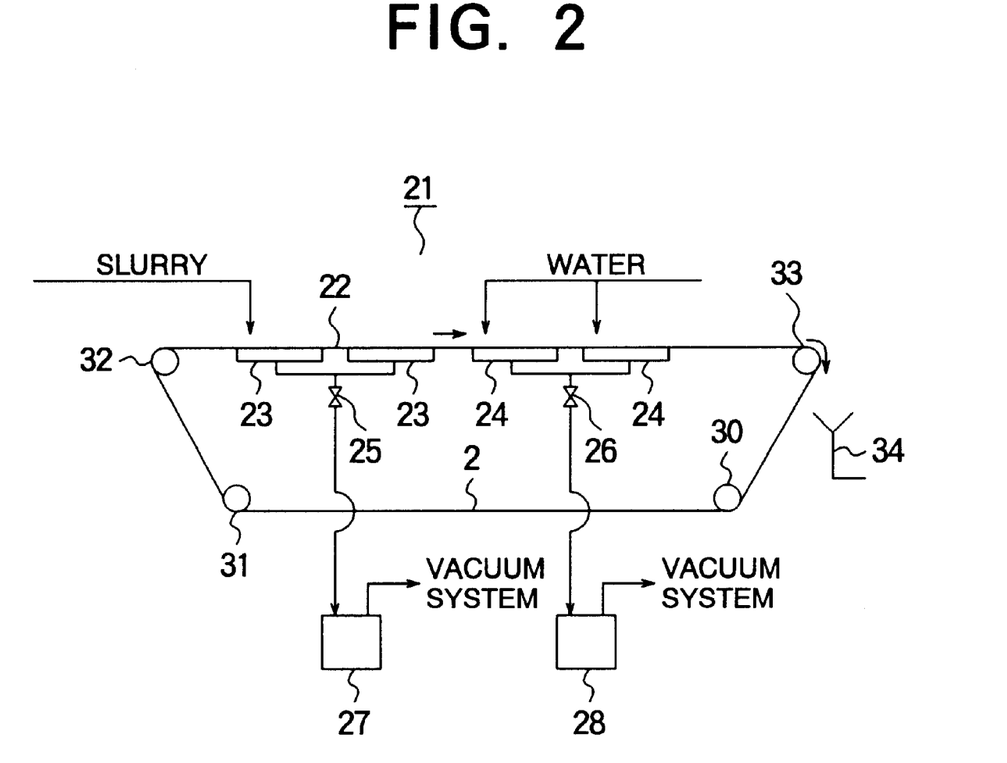
FIG. 2 is a diagram for explaining an apparatus which can be preferably connected with the apparatus of the present invention.

FIG. 2 is a diagram for explaining an apparatus, which can be preferably connected with the apparatus 1 of the present invention.

An apparatus 21 has a ring shaped belt filter 22 formed with four rolls 30, 31, 32 and 33. The material of the belt filter 22 is not particularly limited as long as it does not allow the passage of fine particles of a chlorinated rubber, but does allow the passage of water. Examples thereof include a filter cloth. The belt filter 22 can be moved in the horizontal direction by the filter cloth driving roll 30.

An aqueous chlorinated rubber slurry is supplied onto the belt filter 22. The amount of chlorinated rubber slurry supplied can be determined according to the size of the apparatus, the chlorination conditions, and the like. For example, it is preferable that the chlorinated rubber slurry is supplied on the belt filter 22 in a 5 to 25 mm thickness, most preferably in a 20 mm thickness or less. The belt filter 22 is moved in the horizontal direction by the filter cloth moving roll 30 to reach positions where means for suctioning the water contained in the chlorinated rubber slurry (flat perforated trays 23) are provided therebelow. The belt filter 22 stops at these positions, and suctioning of the water content of the chlorinated rubber slurry is performed.

According to the embodiment of FIG. 2, the chlorinated rubber cake of the present invention can be obtained by suctioning the water in the chlorinated rubber slurry through the belt filter 22 from the trays 23 which are provided at two positions and connected to a vacuum system via a tank 27 by reducing the pressure. The pressure reduction can be easily started or stopped by a valve 25. The suctioned water can be accommodated in the tank 27 so that it can be reused as needed. Accordingly, the water content of the chlorinated rubber cake can be adjusted to, for example, 45 to 60%. The pressure reduction time is preferably 15 to 150 seconds for quality sake.

It is preferable that the chlorinated rubber cake after water suction is moved with the belt filter 22 a predetermined distance in the horizontal direction to be washed with water. It is preferable that the temperature of the washing water is 50° C. or higher in view of the filtration speed. As mentioned above, the belt filter 22 is stopped at positions where the washing water is supplied so that the washing water is supplied from a position above the belt filter 22, and the water is suctioned. According to the embodiment of FIG. 2, trays 24, which are connected to a vacuum system via a tank 28, are provided at two positions. The pressure reduction can be easily started or stopped by a valve 26. The suctioned water can be accommodated by the tank 28 so that it can be reused as needed. After the water suctioning process, the valves 25, 26 are shut off so that the trays 23, 24 return to an ordinary pressure, and the belt filter 22 is moved to perform the above mentioned water suctioning for the supplied chlorinated rubber slurry again. Accordingly, it is preferable that the filter cloth driving roll 30, the valve 25 and the valve 26 are interlocked. The adjusted chlorinated rubber cake moved with the belt filter 22 is dropped from the roll 33 to a cake receptacle 34.

The chlorinated rubber cake obtained accordingly can be supplied to the apparatus shown in FIG. 1 for drying.

The above-mentioned production method of a chlorinated rubber slurry is not particularly limited. For example, the apparatus disclosed in Japanese Patent Laid-Open No. 5-202101 can be used. However, since a large amount of heat is generated by reaction or dilution, the reaction liquid has thixotropic properties so that a remarkably long reaction time is needed when dealing with a large amount thereof, and since chlorine utilization efficiency is poor and foam generated by the surfactant in the reaction liquid prevents liquid transfer or washing, this method is sometimes not appropriate for mass production. Accordingly, it is preferable to produce a chlorinated rubber slurry with the following apparatus.

That is, the preferable apparatus is an apparatus for producing a chlorinated rubber slurry from a reaction liquid obtained by chlorinating a rubber latex or an aqueous dispersion, comprising:

a reaction vessel for accommodating the reaction liquid, provided with an outlet portion for the reaction liquid, a circulating line for guiding the reaction liquid from the outlet portion to outside of the reaction vessel, and returning it back to the reaction vessel, a heat exchanger provided at at least one point in the circulating line, and a UV lamp provided in the reaction vessel and/or the circulating line.

In Japanese Patent Laid-Open No. 5-202101, since chlorination immediately occurs so that heat generation in the reaction substantially finishes several hours from the start of the chlorination, a large amount of heat needs to be eliminated in a short time. According to the present invention, a large amount of the reaction heat can be eliminated efficiently, because a circulating line is provided outside the reaction vessel so as to circulate the reaction liquid and, further, a heat exchanger is provided in the circulating line. The reaction vessel needs to accommodate a highly acidic aqueous dispersion of a polyisoprene rubber and a chlorine gas (hereinafter referred to as a reaction liquid) without corrosion. As a material thereof, for example, a glass lining can be given. Further, it is preferable that the reaction vessel have a 500 to 30,000 liter capacity, with a stirring means provided inside.

The reaction vessel is provided with an outlet portion, with the circulating line connected thereto. The position of the outlet portion of the reaction vessel can be optionally selected, but it is preferable to locate it, for example, at the bottom portion of the reaction vessel so as not to prevent the homogeneous mixing of the reaction liquid in the reaction vessel.

The length of the circulating line needs to be determined according to the size of the reaction vessel and the chlorination degree, and is generally 5 to 30 m. The shape of the circulating line is not particularly limited as long as the heat elimination effect is not disturbed and it is appropriate for installing a heat exchanger. In the case where the circulating line is pipe-like, the diameter thereof is, for example, about 4 to 40 cm. The material of the circulating line needs to be non-corrosive with respect to the reaction liquid, and has, for example, a glass lining.

The reaction liquid in the reaction vessel flows into the circulating line from the outlet portion of the reaction vessel by the function of a pump, and the like so as to flow in the circulating line. The reaction heat is discharged to the outside by the flow of the reaction liquid in the circulating line. The flow rate of the reaction liquid can be optionally selected according to the length and the shape of the circulating line, the chlorination degree, and the like, but is, for example, 0.1 to 10 $m^3$/min. The circulating line starts from the outlet portion of the reaction vessel and returns to the reaction vessel. The finishing point of the circulating line is preferably at a position far from the outlet of the reaction vessel and is immersed in the liquid.

Although the reaction liquid has thixotropic properties, since it flows in the circulating line, the flowability of the reaction liquid is improved so that extension of the reaction time can be suppressed.

The heat exchanger is provided at least at one point in the circulating line for further improving the heat eliminating effect. A heat exchanger of a known type can be used. Examples thereof include commercially available tube type heat exchangers and plate type heat exchangers. Furthermore, it is preferable to provide one, or a plurality of, static mixer(s) in the circulating line. This configuration enhances the chlorine gas dispersion so that chlorine utilization efficiency is improved, the chlorination rate is increased, and foam formation by the surfactant in the reaction liquid can be suppressed. It is well known that a static mixer is an in-line stirrer without a drive portion where right-handed and left-handed spiral elements are alternately provided with the end of an element provided perpendicular to the end of an adjacent element, capable of efficiently mixing liquids, gases and flowable solids. Further, since the energy necessary for mixing corresponds to the pressure loss at the time the fluid passes through the mixer, the amount of energy consumed is small. The number of elements is optional, but can be, for example, 4 to 24.

A chlorinated rubber is produced while irradiating ultraviolet rays into the reaction liquid. The ultraviolet ray irradiation can be conducted by, for example, providing a UV lamp in the reaction vessel and/or the circulating line to improve the efficiency. It has been confirmed that the chlorination can proceed smoothly with a UV lamp provided at either position, but it is preferable that it be provided in the reaction vessel. Although the reaction rate is facilitated by increasing the irradiation intensity of the ultraviolet rays, the reaction heat rises accordingly. Therefore, the ultraviolet ray irradiation intensity can be optionally selected in consideration of these factors. Further, in the case where a UV lamp is provided in the circulating line, it is preferable that the size and the position of the UV lamp be determined in consideration of the flow rate of the reaction liquid, the circulation frequency, and the capability of the circulation pump.

Figure 4:
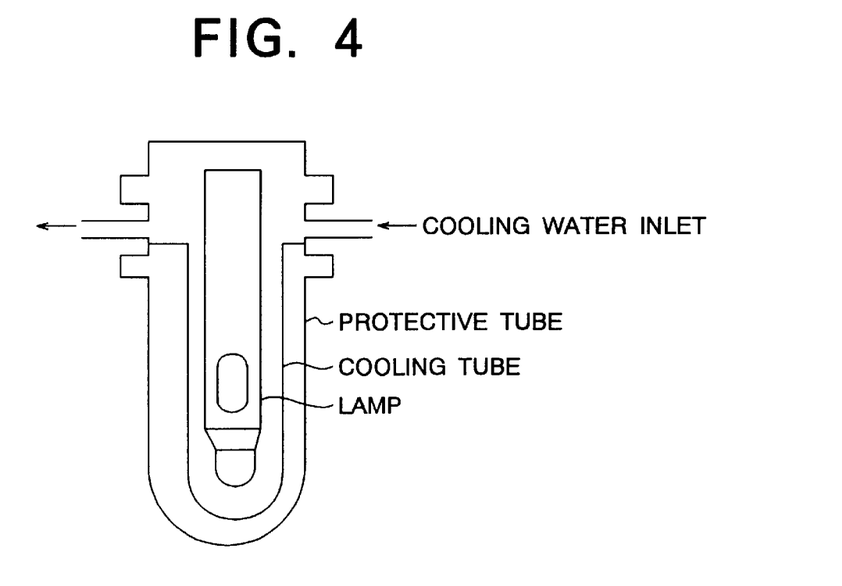
FIG. 4 is a diagram for explaining a UV lamp which can be preferably used in the apparatus of FIG. 3.

As shown in FIG. 4, it is preferable that the UV lamp have a dual structure for cooling the heat generated by the mercury lamp with cooling water, and wherein starting and stopping is controlled automatically for safety.

At the time of operation, it is preferable to, for example, place a high concentration acidic aqueous solution in the reaction vessel, introduce a saturated amount of a chlorine gas into the circulating line while the solution is circulated by a pump for sufficient mixing and dissolving, and then with the UV lamp on slowly inject an aqueous dispersion of a polyisoprene rubber thereto, while blowing a chlorine gas in a supply amount sufficient for reaction.

It is preferable that the chlorine gas and the aqueous dispersion be introduced from the upstream side of the static mixer.

The polyisoprene rubber to be used is a polymer containing an isoprene unit in a molecular chain as the main component. Concrete examples thereof include natural rubber, a synthetic polyisoprene, or copolymers of isoprene and a monomer having a hydrophilic group, such as a hydroxyl group, a carboxyl group, and an amide group, copolymers of isoprene and a vinyl monomer such as (meth)acrylate, copolymers of isoprene and another diene type monomer such as butadiene, grafted polyisoprene obtained by grafting maleic acid, maleic anhydride, or succinic acid. These can be used alone or in combination of two or more.

The average particle size of a polyisoprene rubber in an aqueous dispersion is, in general, 100 $\mu$m or less, preferably 20 $\mu$m or less, more preferably 1 $\mu$m or less. An excessively large average particle size prevents homogeneous chlorination so that uneven solubility occurs with respect to organic solvents such as toluene and undissolved portions may occur.

Examples of acids used for a high concentration aqueous solution of an acid include strong acids such as hydrochloric acid, sulfuric acid, and nitric acid. Among these examples, hydrochloric acid or a combination of hydrochloric acid and sulfuric acid or nitric acid is preferable in terms of smoothly conducting the chlorination process.

The concentration of the acid in the high concentration aqueous solution of an acid is, in general, 5% by weight or more, preferably 10% by weight or more, more preferably 15% by weight or more.

In the case where a natural rubber latex is used, a high chlorination can be achieved without rubber particle agglomeration with an acid concentration of 2% by weight or more, preferably 5% by weight or more in the presence of a surfactant described below. The upper limit of the acid concentration is in general, 40% by weight, preferably about 36% by weight.

In the case where an aqueous dispersion of a polyisoprene rubber and a high concentration aqueous solution of an acid are mixed, the concentration of the polyisoprene rubber when starting the chlorination reaction is, in general, 1% by weight or more, preferably about 2 to 10% by weight. A lower polymer concentration in the highly acidic aqueous dispersion is preferable in order to control the chlorination reaction, but in view of the balance with productivity, 2 to 10% by weight is appropriate. Furthermore, with this polymer concentration range, a highly acidic condition can be stably maintained.

In the case where an aqueous dispersion of a polyisoprene rubber and a high concentration aqueous solution of an acid are mixed, it is preferable that a surfactant is present in order to improve the dispersion of the fine rubber particles. However, in the case where the aqueous dispersion of the polyisoprene rubber contains the surfactant, addition of the surfactant is not necessary.

As a surfactant, a nonionic surfactant, an anionic surfactant, a mixture thereof, and a nonionic-anionic surfactant which are not degenerated by an acid can be preferably used. With a natural rubber latex, a nonionic or nonionic-anionic surfactant is extremely preferable for preventing agglomeration.

Examples of nonionic surfactants include a condensed product of polyoxyethylene polyoxypropylene, polyoxyalkylene alkylether, polyoxyalkylene nonylphenolether, sorbitan fatty acid ester, polyoxyalkylene sorbitan fatty acid ester, and polyoxyalkylene glycerin fatty acid ester. Among these examples, those having an HLB (hydrophile-liphophile balance) of 8 or more are preferable.

Examples of anionic surfactants include higher alcohol sulfate, alkyl benzene sulfonic acid salt, alkyl phosphate salt, polyoxyalkylene sulfate, and dialkyl sulfosuccinic acid salt. However, higher fatty acid soap and the like, which can be easily degenerated by acids, are not preferable.

Examples of nonionic-anionic surfactants include polyoxyethylene alkyl ether sodium sulfate, and polyoxyethylene alkyl aryl ether sodium sulfate.

The amount of the surfactant is preferably at the minimum level such that the dispersion stability of a highly acidic aqueous dispersion of a polyisoprene rubber can be ensured. In general, it is 15 parts by weight or less with respect to 100 parts by weight of the polyisoprene rubber, preferably 0.1 to 10 parts by weight, more preferably 1 to 7 parts by weight. An excessively large ratio of the surfactant may affect chlorination.

The reaction temperature is preferably in the range of 0 to 90° C. With a temperature lower than 0° C., a problem in that the medium freezes may occur, on the other hand, with a temperature higher than 90° C., rubber particles can easily adhere to each other. It is preferable that the temperature is kept at a low temperature of about 40° C. or less in the initial stage of the chlorination reaction and is raised in the later stage. The reaction time partly depends on the chlorination degree, but, in general, it is about 2 to 20 hours. The chlorine gas supply can be either by feed type or sealed type, and further, in either ordinary pressure or under pressurization.

The chlorination degree can be optionally determined as needed. However, in general, chlorination is conducted until the chlorine concentration (chlorine amount) in the chlorinated rubber comes in the range of 55 to 75% by weight. With an excessively low chlorine concentration, the obtained chlorinated rubber cannot be easily dissolved in an organic solvent, such as toluene, and compatibility with a plasticizer or another resin is lowered. On the other hand, with an excessively large chlorine concentration, the chlorinated rubber cannot be easily dissolved in an organic solvent.

A radical initializer or another additive can be added as needed at the time of chlorination. The viscosity of the chlorinated rubber in the organic solvent can be optionally selected by introducing a catalyst, air, an oxide, and the like during chlorination and adjusting the introduction amount.

Figure 8:
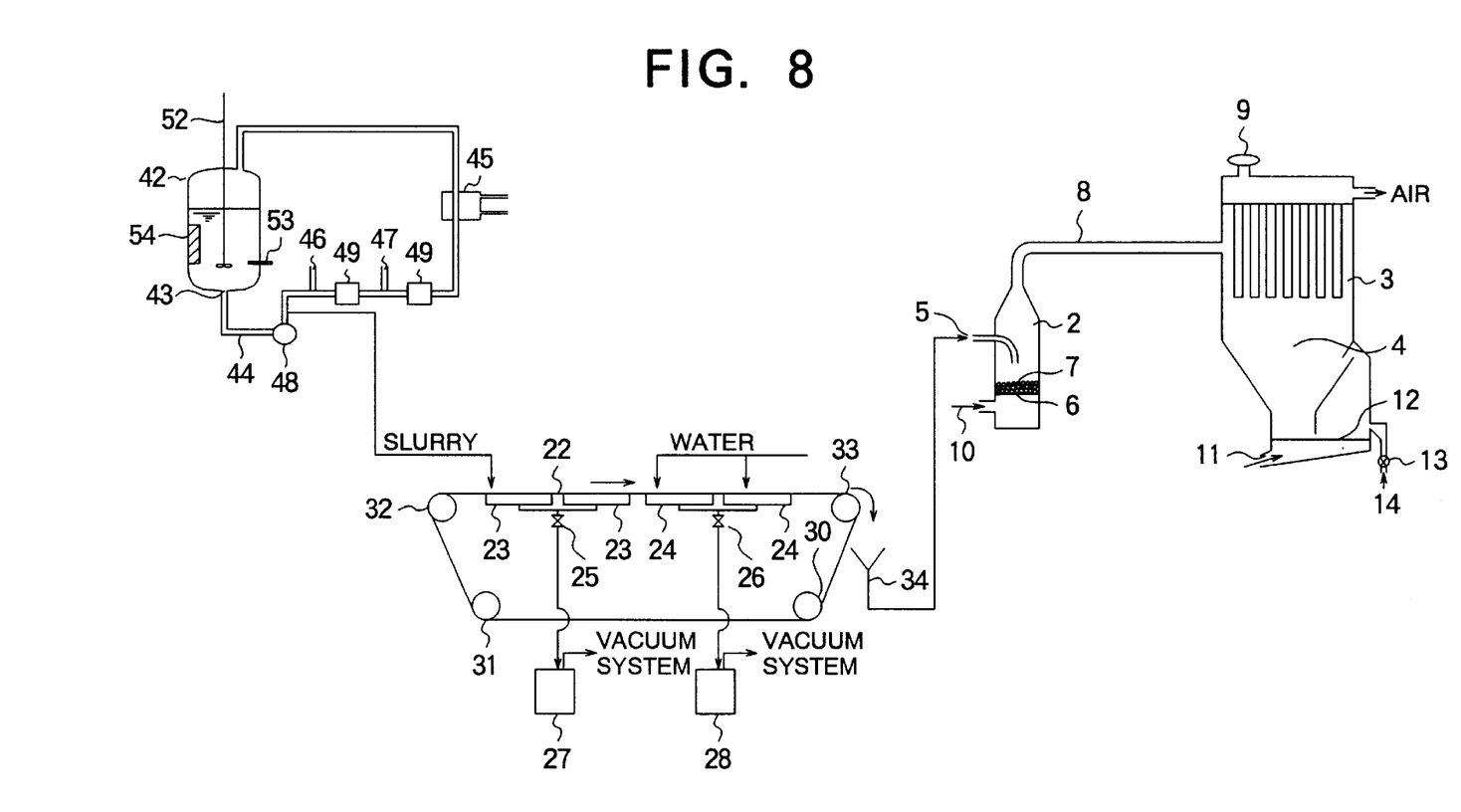
FIG. 8 is a diagram for explaining one embodiment of the apparatus of the present invention.

A preferred embodiment of the present invention is that a chlorinated rubber slurry obtained accordingly is processed into a chlorinated rubber cake by the apparatus shown in FIG. 2, and is dried by the apparatus shown in FIG. 1. A further preferred embodiment is that, as shown in FIG. 8, the apparatuses are interlocked and automatically operated.

EXAMPLES

Hereinafter the present invention will be further described with reference to examples and comparative examples.

Chlorinated Rubber Slurry Production Example 1

Figure 3:
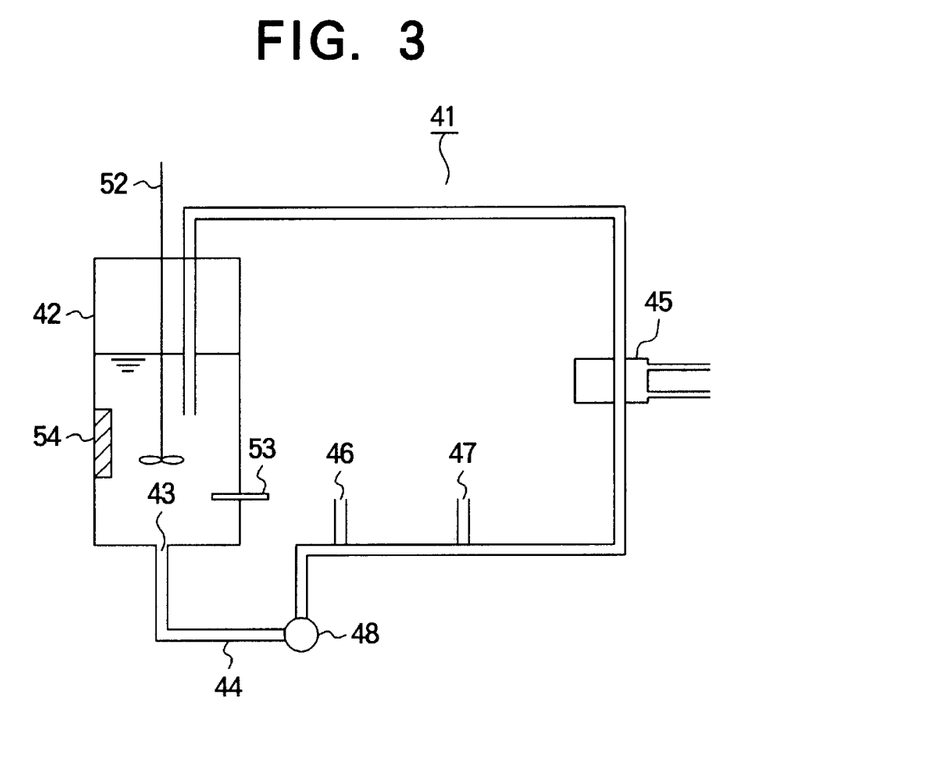
FIG. 3 is a diagram for explaining an apparatus which can be preferably connected with the apparatus of the present invention.

A chlorinated rubber slurry was produced with the apparatus shown in FIG. 3.

The apparatus 41 of FIG. 3 comprises a 500-liter cylindrical reaction vessel 42 provided with a stirrer 52, a thermometer 53, a UV lamp 54 (a high pressure mercury lamp having the configuration in FIG. 4, produced by Toshiba Lightec Corp.), having an outlet portion at the lower portion thereof; a pipe-like circulating line 44 starting from the outlet portion 43 of the reaction vessel 42 for circulating the reaction liquid and having a 10 m length and 5 cm diameter, and a heat exchanger 45 (tube type heat exchanger produced by Le Carbon Corp.) at one point in the circulating line. The circulating line 44 is provided with a chlorine gas injecting opening 46, a latex injecting opening 47, and an injecting pump (not illustrated). A circulating pump 48 is provided between the reaction vessel 42 and the chlorine gas injecting opening 46.

In the reaction vessel was placed 444 kg of 35% by weight of hydrochloric acid. The circulating pump was operated while stirring the hydrochloric acid with a stirrer at 107 rpm so as to circulate the hydrochloric acid from the outlet portion into the circulating line at a rate of 10 m$^3$/hour. The temperature of the circulating hydrochloric acid was maintained at 10° C. or lower with a chlorine gas injected into the circulating line at a rate of 9.6 kg/hour and dissolved.

Next, 2.5 kg of polyoxyalkylene nonyl phenol ether (solid component concentration: 10% by weight) and 11.8 kg of pure water were added to 41.7 kg of a natural rubber latex preliminarily stabilized by a low ammonia treatment (solid component concentration: 60%), and mixed homogeneously to prepare an aqueous dispersion (solid component concentration: 45% by weight). Subsequently, 56.0 kg of the aqueous dispersion was injected from the latex injecting opening of the circulating line over 4 hours with the UV lamp on and the temperature of the reaction vessel was maintained at 30° C. Then, 71.3 kg of a chlorine gas and 200 l of oxygen were introduced from the chlorine gas injecting opening 46 over 14 hours with the temperature in the apparatus maintained at 20 to 30° C. The dispersion state of the particles was extremely good during chlorination.

After the reaction, chlorinated polyisoprene fine particles were separated by filtration, washed with water, and dried at 50° C. under a reduced pressure. The chlorine content of the dried white powdery chlorinated product was 65% by weight. A 20% by weight toluene solution of the chlorinated product was colorless and transparent and had a viscosity of 20 cps/25° C.

Chlorinated Rubber Slurry Production Example 2

Figure 5:
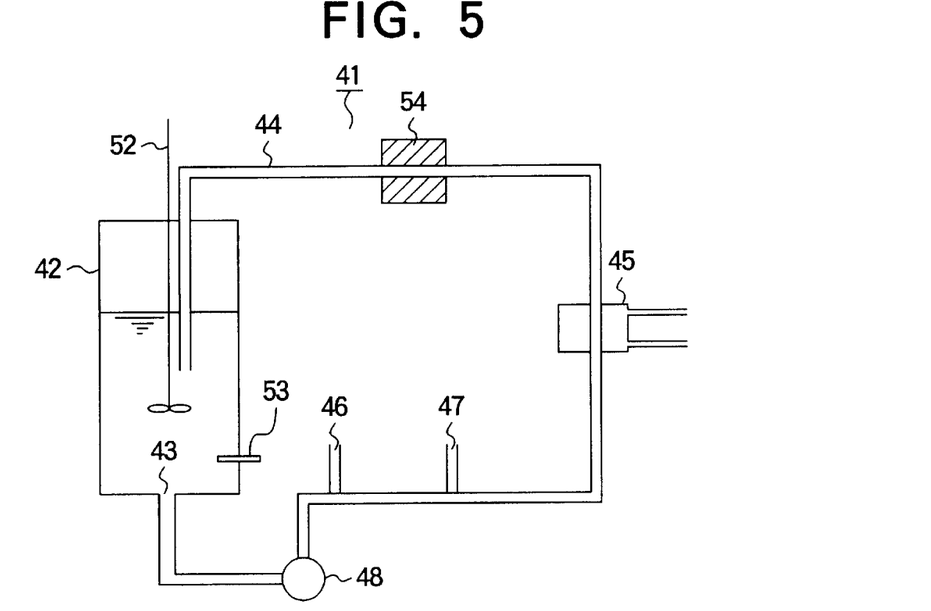
FIGS. 5 to 7 are diagrams for explaining apparatuses which can be preferably connected with the apparatus of the present invention.

A chlorinated rubber slurry was produced with the same apparatus and process as production example 1. However, the UV lamp 54 was placed in the circulating line 44 as shown in FIG. 5.

As a result, the dispersion state of the particles was extremely good during chlorination.

After the reaction, chlorinated polyisoprene fine particles were separated by filtration, washed with water, and dried at 50° C. under a reduced pressure. The chlorine content of the dried white powdery chlorinated product was 65% by weight. A 20% by weight toluene solution of the chlorinated product was colorless, transparent and had a viscosity of 21 cps/25° C.

Chlorinated Rubber Slurry Production Example 3

Figure 6:
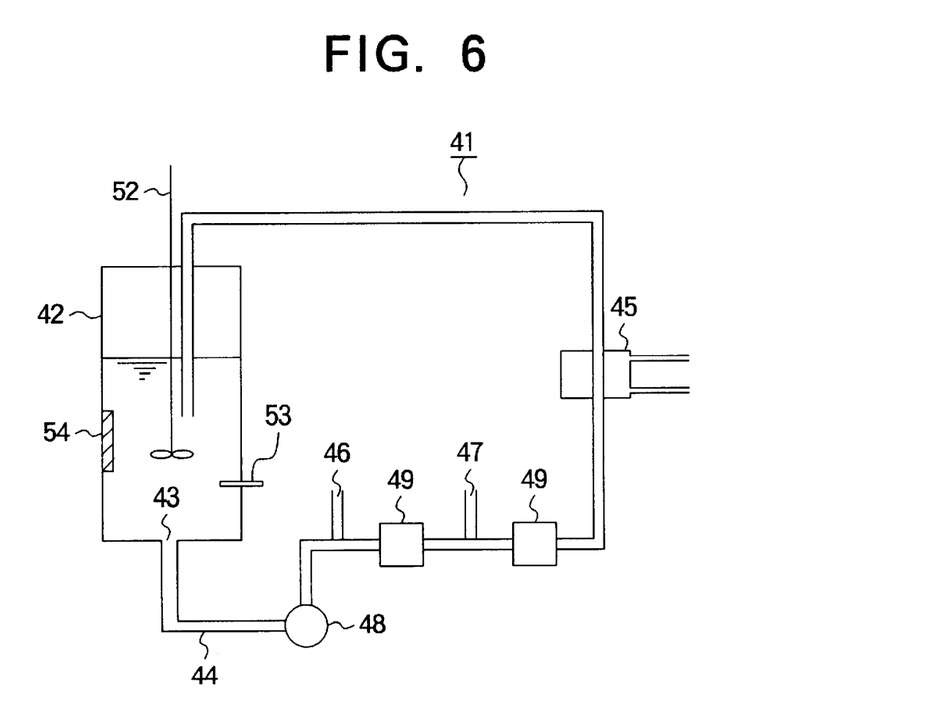

A chlorinated rubber slurry was produced with the same apparatus and process as production example 1. However, static mixers 49 were provided at two points, that is, between the chlorine gas injecting opening 46 and the latex injecting opening 47, and between the latex injecting opening 47 and the heat exchanger 45 as shown in FIG. 6. Further, 80.1 kg of the chlorine gas and 200 l of oxygen were introduced from the injecting opening 46 provided upstream of the static mixer over 14 hours.

As a result, the dispersion state of the particles was extremely good during chlorination.

After the reaction, chlorinated polyisoprene fine particles were separated by filtration, washed with water, and dried at 50° C. under a reduced pressure. The chlorine content of the dried white powdery chlorinated product was 67% by weight. A 20% by weight toluene solution of the chlorinated product was colorless and transparent and had a viscosity of 17 cps/25° C.

Chlorinated Rubber Slurry Production Example 4

Figure 7:
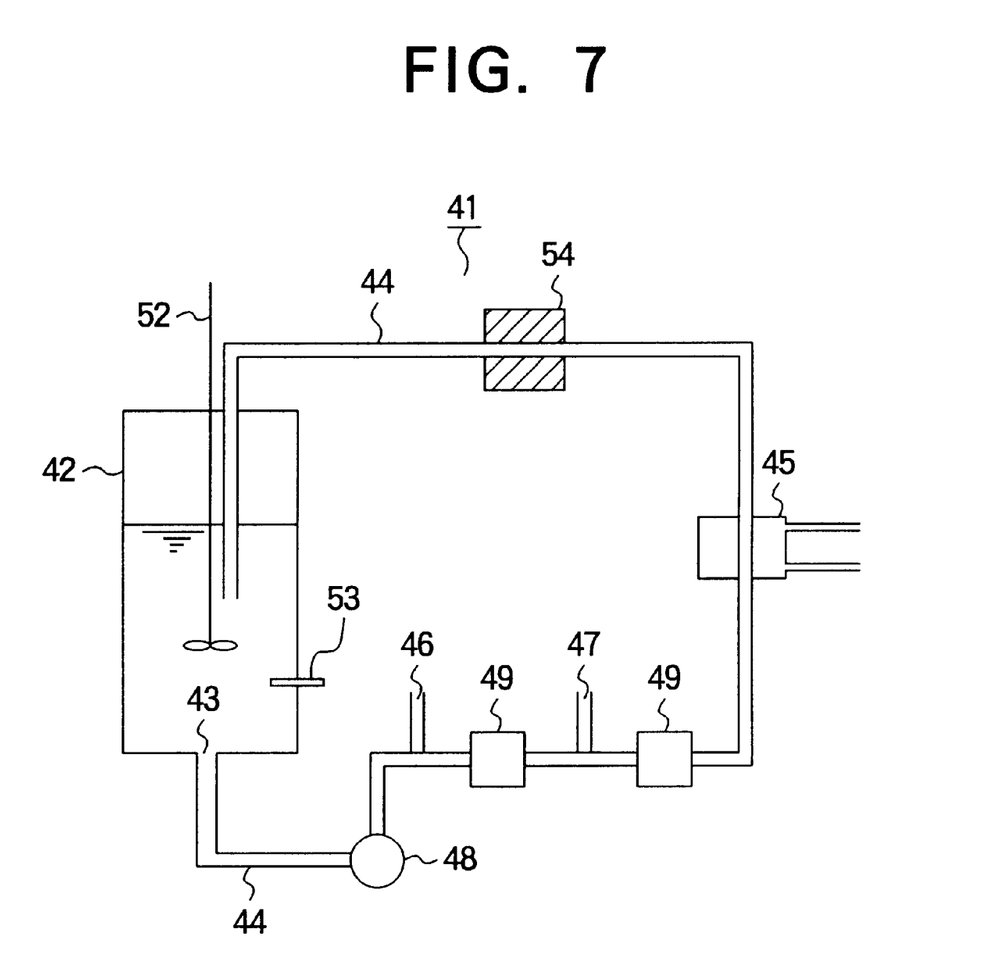

A chlorinated rubber slurry was produced with the same apparatus and process as production example 3. However, the UV lamp 54 was placed in the circulating line 44 as shown in FIG. 7. Further, 81.0 kg of the chlorine gas and 200 l of oxygen were introduced from the injecting opening 46 provided upstream of the static mixer over 14 hours.

As a result, the dispersion state of the particles was extremely good during chlorination.

After the reaction, chlorinated polyisoprene fine particles were separated by filtration, washed with water, and dried at 50° C. under a reduced pressure. The chlorine content of the dried white powdery chlorinated product was 67% by weight. A 20% by weight toluene solution of the chlorinated product was colorless and transparent and had a viscosity of 21 cps/25° C.

Chlorinated Rubber Slurry Production Example 5

The production example 3 was repeated except that 40 l of oxygen was used.

As a result, the dispersion state of the particles was extremely good during chlorination.

After the reaction, chlorinated polyisoprene fine particles were separated by filtration, washed with water, and dried at 50° C. under a reduced pressure. The chlorine content of the dried white powdery chlorinated product was 67% by weight. A 20% by weight toluene solution of the chlorinated product was colorless and transparent and had a viscosity of 150 cps/25° C.

Chlorinated Rubber Slurry Production Example 6

The production example 4 was repeated except that 38 l of oxygen was used.

As a result, the dispersion state of the particles was extremely good during chlorination.

After the reaction, chlorinated polyisoprene fine particles were separated by filtration, washed with water, and dried at 50° C. under a reduced pressure. The chlorine content of the dried white powdery chlorinated product was 67% by weight. A 20% by weight toluene solution of the chlorinated product was colorless and transparent and had a viscosity of 160 cps/25° C.

Chlorinated Rubber Cake Production Example

Chlorinated rubber cakes were produced from the chlorinated rubber slurries prepared in production examples 1 to 6 with the apparatus shown in FIG. 2.

The slurry containing 12% of a chlorinated rubber after the chlorination reaction (before drying) was supplied at a rate of 500 kg/hour onto a horizontally-movable filter cloth in production examples 1 to 6. The filter cloth was set to move for 3 seconds every 40 seconds. Therefore, the pressure reduction time was 37 seconds and during this time the thickness of the chlorinated rubber slurry was controlled to be 8 to 11 mm. Then the filter cloth was moved horizontally 200 cm and 70° C. washing water was supplied onto the chlorinated rubber slurry at a rate of 750 kg/hour, and water suction was performed. After about 40 minutes, discharge of the chlorinated rubber cake into the cake receptacle was started. The water content of the obtained chlorinated rubber cake was 55%, which allows easy mechanical flow.

Example 1

The present invention was implemented with the apparatus of FIG. 1. The apparatuses (FIGS. 3, 5 to 7) used in production examples 1 to 4 of a chlorinated rubber slurry, the apparatus (FIG. 2) used in production example of a chlorinated rubber cake, and the apparatus of FIG. 1 were interlocked by an ordinary method.

Hot air of 80° C. was provided from the hot air blowing opening 10 such that the balls 7 could move sufficiently. The chlorinated rubber cake having a 55% water content obtained in production example of the chlorinated rubber cake (the cake obtained using the slurry in production example 1) was introduced from the chlorinated rubber cake supply opening 5 at a rate of 60 kg/hour into the fluidized medium drying means 2 to obtain a wet powder (chlorinated rubber powder). The powder after passing through the conduit 8 came in contact with the bag filter 3, and reached the fluidized drying means 4 at the downstream side. The powder adhered to the bag filter 3 was blown away by the pulsed air from the pulse air generator 9, which was operated for 0.5 second at intervals of 30 seconds. Hot air of 80° C. from the hot air blowing opening 11 at the bottom portion of the fluidized drying means 4 passed through the flat perforated tray 12 to further dry the powder. The powder was finally obtained from the powder output opening 14 through the rotary valve 13 at a rate of about 26 kg/hour. The water content of the obtained powder was 0.2% or less. The time required from the input of the chlorinated rubber cake to the powder output opening 14 was about 1 hour. The viscosity of a 20% toluene solution of the final powder obtained in this example was 18 cp, and was always constant. Next, Example 1 was repeated except that the chlorinated rubber slurry was changed to those obtained in the production examples 2 to 6. The same results were obtained. Further, the viscosity of a 20% toluene solution of the final powder obtained from the slurries in production examples 2 to 6 were 19, 15, 19, 135 and 144 cp, respectively, and this was always constant.

Comparative Example 1

A block of 20 kg of the chlorinated rubber cake having a 55% water content, same as example 1, (the cake obtained using the slurry in production example 1) was manually formed into a block with a thickness of 30 mm or less and placed in a shelf type drier which introduces hot air from a lower portion and wherein three plates of 30 mm height, 600 mm length and 1,000 mm width can be set. Then hot air of 120 to 130° C. was introduced for 2 hours. At this time, the water content of the cake was 15%. After pulverization, the cake was placed in the drier again to be dried for 4 hours while introducing hot air of 100° C. from the lower portion to obtain a chlorinated rubber with a 0.3% water content. The viscosity of a 20% toluene solution thereof was irregular in the range of 12 to 17 cp depending on the sampled portion.

Next, Comparative Example 1 was repeated except that the chlorinated rubber slurry was changed to those obtained in the production examples 2 to 4. The same results were obtained. Further, the Comparative Example 1 was repeated except that the chlorinated rubber slurry was changed to those obtained by the production examples 5 and 6. The viscosity of a 20% toluene solution thereof was irregular in the range of 90 to 120 cp depending on the sampled portion.

Industrial Applicability

According to the present invention, since a chlorinated rubber cake is fluidized-dried with a drying medium, most of the water content in the cake can be eliminated without adhesion to the wall portions of the drier. Further, since it is finishing-dried by performing fluidized-drying again, viscosity changes in the chlorinated rubber can be suppressed. Moreover, since the powder finally obtained has an appropriate particle size, it is easy to handle. Furthermore, since the method of the present invention allows a lower temperature drying process than conventional ones, the material of the drier can be selected in a wider range. That is, according to the present invention, a method and apparatus for obtaining a high quality chlorinated rubber efficiently with easy handling from an acidic or highly acidic chlorinated rubber cake obtained after chlorinating a rubber latex or an aqueous dispersion can be provided.

A chlorinated rubber can be obtained even more efficiently in combination with the production apparatus of a chlorinated rubber slurry and/or the production apparatus of a chlorinated rubber cake as described above.

What is claimed is:

1. A method for producing a chlorinated rubber comprising:
    fluidized drying an acidic or highly acidic chlorinated rubber cake obtained after chlorinating a rubber latex or an aqueous dispersion with a drying medium to obtain a preliminary dried powder; and
    fluidized drying the preliminary dried powder again.

2. The method according to claim 1, wherein the temperature of the fluidized drying with the drying medium is 50 to 130° C.

3. The method according to claim 2, wherein the drying medium is balls having a 2 to 5 mm diameter.

4. The method according to claim 1, wherein the chlorinated rubber cake is obtained by supplying an acidic or highly acidic chlorinated rubber slurry, after chlorinating the rubber latex or the aqueous dispersion, onto a horizontally-movable belt filter, and suctioning water contained in the chlorinated rubber slurry.

5. The method according to claim 1, wherein the chlorinated rubber slurry is obtained by taking the acidic or highly acidic latex or aqueous dispersion of the rubber in a reaction vessel outside the reaction vessel by a circulating line so that a chlorine gas is blown to the latex or the aqueous dispersion for chlorination while eliminating the generated heat of the latex or the aqueous dispersion by a heat exchanger.

6. An apparatus for producing a chlorinated rubber comprising an (A) unit comprising:
    a fluidized drying medium drying means having a supply opening for a chlorinated rubber cake, and drying medium balls in the inside portion thereof;
    a bag filter connected with the fluidized medium drying means via a conduit; and a fluidized drying means for drying powder which has contacted the bag filter.

7. The apparatus according to claim 6, further comprising a (B) unit for producing the chlorinated rubber cake from a chlorinated rubber slurry obtained after chlorinating a rubber latex or an aqueous dispersion, comprising:

a belt filter movable in the horizontal direction; and a means for suctioning water contained in the chlorinated rubber slurry via the belt filter, wherein the (A) unit receives the chlorinated rubber cake from the (B) unit.

8. The apparatus according to claim 7, further comprising a (C) unit for producing the chlorinated rubber slurry obtained by chlorinating a rubber latex or an aqueous dispersion, comprising:

a reaction vessel for accommodating a reaction liquid, provided with an outlet portion for the liquid, a circulating line for guiding the reaction liquid from the outlet portion to outside of the reaction vessel, and returning it back to the reaction vessel, a heat exchanger provided in at least one point in the circulating line, and a UV lamp provided in the reaction vessel and/or the circulating line, wherein the (B) unit receives the chlorinated rubber slurry from the (C) unit.

* * * * *